(12) United States Patent
Kubota et al.

(10) Patent No.: US 8,707,097 B2
(45) Date of Patent: Apr. 22, 2014

(54) INFORMATION PROCESSING APPARATUS, CONTROL APPARATUS, AND METHOD

(75) Inventors: Ryo Kubota, Kawasaki (JP); Takanori Ishii, Kawasaki (JP); Kentarou Yuasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 13/272,326

(22) Filed: Oct. 13, 2011

(65) Prior Publication Data
US 2012/0102356 A1 Apr. 26, 2012

(30) Foreign Application Priority Data
Oct. 22, 2010 (JP) .................................. 2010-237166

(51) Int. Cl.
G06F 11/00 (2006.01)
(52) U.S. Cl.
USPC ............................................ 714/14; 714/4.1
(58) Field of Classification Search
USPC .......................................................... 714/14
See application file for complete search history.

(56) References Cited

U.S. PATENT DOCUMENTS

| | | | |
|---|---|---|---|
| 5,923,099 A * | 7/1999 | Bilir ................................ 307/64 |
| 6,993,680 B2 * | 1/2006 | Fukumori ....................... 714/14 |
| 7,360,107 B2 * | 4/2008 | Yuasa ............................ 713/340 |
| 7,406,623 B2 * | 7/2008 | Takahashi et al. ............... 714/14 |
| 7,840,840 B2 * | 11/2010 | Takahashi et al. ............... 714/14 |
| 8,055,933 B2 * | 11/2011 | Jaehde et al. .................... 714/4.1 |
| 8,230,257 B2 * | 7/2012 | Wilson ............................ 714/14 |
| 2008/0290733 A1 * | 11/2008 | Takahashi et al. ............... 307/66 |
| 2010/0318844 A1 * | 12/2010 | Matsuda et al. .................. 714/6 |
| 2011/0022882 A1 * | 1/2011 | Jaehde et al. ..................... 714/4 |

FOREIGN PATENT DOCUMENTS

| | | |
|---|---|---|
| JP | 2001-339843 A | 12/2001 |
| JP | 2002-073104 A | 3/2002 |

\* cited by examiner

*Primary Examiner* — Kamini Patel
(74) *Attorney, Agent, or Firm* — Fujitsu Patent Center (57) ABSTRACT

An information processing apparatus includes a controller, a plurality of electric power supply units and a backup electric power supply unit that supply electric power to the controller. The controller detects a malfunction occurring in the plurality of electric power supply units, stops electric power supply from the plurality of electric power supply units, starts electric power supply from the backup electric power supply unit when a malfunction is detected, identifies an electric power supply unit having a malfunction from the plurality of electric power supply units, disconnects the identified electric power supply unit, resumes electric power supply from an electric power supply unit determined to function normally and stops the electric power supply from the backup electric power supply unit when the electric power supply unit having the malfunction is disconnected.

12 Claims, 8 Drawing Sheets

INFORMATION PROCESSING APPARATUS, CONTROL APPARATUS, AND METHOD

CROSS-REFERENCE TO RELATED APPLICATION

This application is based upon and claims the benefit of priority of the prior Japanese Patent Application No. 2010-237166, filed on Oct. 22, 2010, the entire contents of which are incorporated herein by reference.

FIELD

The embodiments discussed herein are related to an information processing apparatus, a control method and a control apparatus.

BACKGROUND

A redundant array of independent disks (RAID) apparatus includes two or more power supply units (PSUs) each of which supplies electric power to each controller module (CM).

When a parallel redundant operation of the PSUs is performed, an output from the two or more PSUs is supplied to the CM through a back plane (BP) as a single output. In addition, when a malfunction occurs in an output of a PSU, the PSU self-detects the output malfunction and stops the output or performs malfunction notification. However, on the occasion that an internal control circuit or an internal power source circuit in a PSU breaks down, the PSU may not detect the malfunction and not stop the output.

When an overvoltage malfunction occurs in which the output voltage of a PSU increases more than a target voltage, a CM may be able to detect the overvoltage malfunction because a voltage supplied to the CM through a BP increases. However, on the occasion that a PSU may not self-detect a malfunction, it is difficult for a CM to identify a PSU in which an overvoltage malfunction occurs, from among two or more PSUs because malfunction notification is not performed from the PSU.

In addition, in a case of a low voltage malfunction in which the output voltage of a PSU falls below a target voltage, a CM may not detect a low voltage malfunction as long as one of two or more PSUs normally functions because a voltage supplied to the CM through a BP does not vary. In addition, when a PSU may not self-detect a malfunction, the PSU does not output a malfunction notification, so that a CM may not detect a low voltage malfunction.

SUMMARY

According to an aspect of the invention, an information processing apparatus includes a controller, a plurality of electric power supply units that supply electric power to the controller, and a backup electric power supply unit that supplies electric power to the controller, the controller being configured to detect a malfunction occurring in the plurality of electric power supply units, stop electric power supply from the plurality of electric power supply units, start electric power supply from the backup electric power supply unit when the malfunction is detected, identify an electric power supply unit having the malfunction from the plurality of electric power supply units, disconnect the identified electric power supply unit, resume electric power supply from an electric power supply unit determined to function normally, and stops the electric power supply from the backup electric power supply unit when the electric power supply unit having the malfunction is disconnected.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF THE EMBODIMENT

Preferred embodiments of the present techniques will be explained with reference to accompanying drawings. Hereinafter, embodiments according to an information processing apparatus, a control method, and a control apparatus are described with reference to drawings.

An Embodiment

Figure 1:
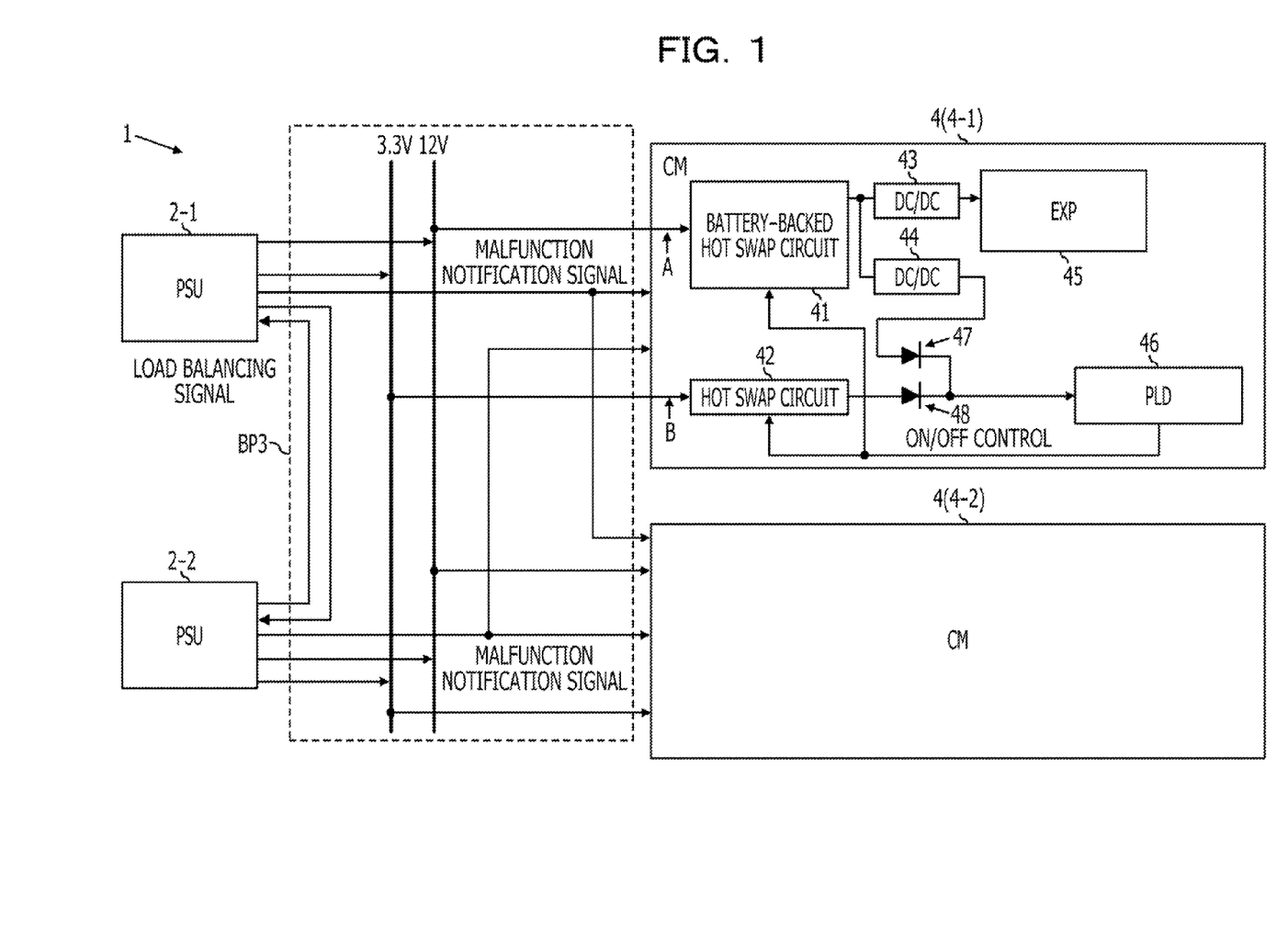
FIG. 1 illustrates a configuration of a system according to an example of an embodiment.

FIG. 1 illustrates a configuration of a system 1 according to an example of an embodiment. The system (information processing apparatus) 1 illustrated in FIG. 1 includes PSUs 2-1, 2-2, a BP 3, and CMs 4-1 and 4-2. In addition, electric power output from the PSUs 2-1 and 2-2 is supplied to the CM 4-1 and 4-2 through the BP 3.

Hereinafter, as a reference numeral indicating a "PSU", reference numerals 2-1 or 2-2 are used when one of two or more PSUs is desired to be identified. Alternatively, reference numeral 2 is used when a given PSU is indicated. In addition, as a reference numeral indicating a "CM", reference numerals 4-1 or 4-2 are used when one of two or more CMs is desired to be identified. Alternatively, reference numeral 4 is used when a given CM is indicated. The CM 4-1 and 4-2 have substantially the same configuration, therefore, for convenience, the illustration of the configuration of the CM 4-2 is omitted in FIG. 1.

Figure 2:
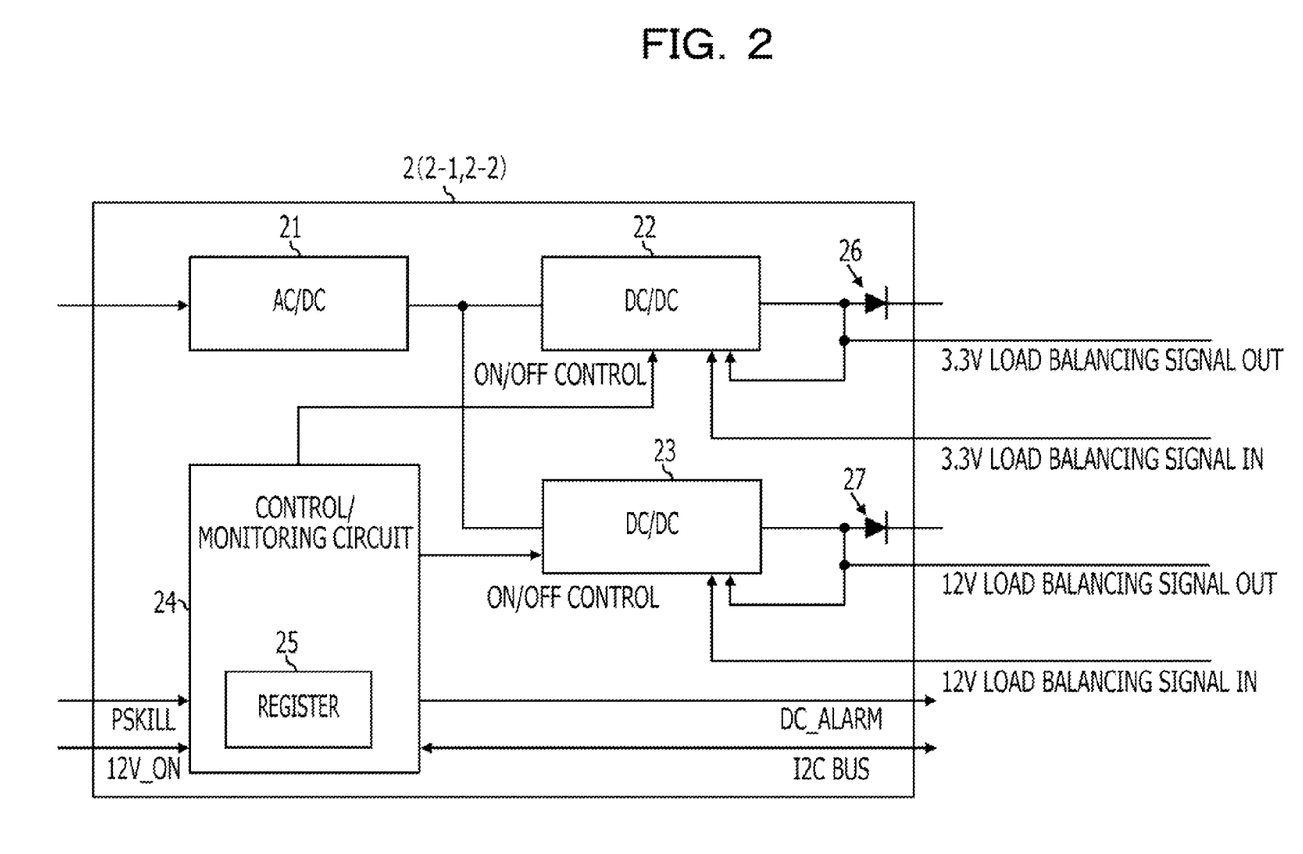
FIG. 2 illustrates a configuration of a PSU according to an example of the embodiment.

The PSU 2 may supply electric power to various apparatuses such as the CMs 4-1 and 4-2. For example, the PSU 2 may supply electric power of 3.3V to each of the CMs 4-1 and 4-2 as a resident power supply unit and supply electric power of 12V to each of the CMs 4-1 and 4-2. That is, the PSU 2 functions as an example of an electric power supply unit that supplies electric power to a controller. As illustrated in FIG. 2, the PSU 2 includes, for example, an alternating current (AC)/ direct current (DC) conversion circuit 21, DC/DC conversion circuits 22 and 23, a control/monitoring circuit 24, a register 25, and diodes 26 and 27.

The AC/DC conversion circuit 21 is coupled to an external AC power supply source (not illustrated) through a protection circuit (not illustrated) such as a fuse or a rush current prevention circuit, and coupled to the DC/DC conversion circuits 22 and 23. In addition, the DC/DC conversion circuit 22 is coupled to the anode-side of the diode 26 for blocking reverse flow. In addition, the DC/DC conversion circuit 23 is coupled to the anode-side of the diode 27 for blocking reverse flow. In addition, the control/monitoring circuit 24 is coupled to each of the DC/DC conversion circuits 22 and 23.

The AC/DC conversion circuit 21 converts AC electric power (not illustrated) input from the outside of the PSU 2 into DC electric power. The converted DC electric power is input to each of the DC/DC conversion circuits 22 and 23. The DC/DC conversion circuit 22 is a circuit that converts an output from the AC/DC conversion circuit 21 into a target voltage. In the example of the embodiment, a DC/DC conversion circuit 22 in a PSU 2 converts an output of an AC/DC conversion circuit 21 in the PSU 2 into a voltage of 3.3V, and outputs the converted voltage to the BP 3. In addition, the DC/DC conversion circuit 22 in the PSU 2 outputs the converted signal to a DC/DC conversion circuit 22 in the other PSU 2 as a load balancing signal. In addition, a load balancing signal from the DC/DC conversion circuit 22 in the other PSU 2 is input to the DC/DC conversion circuit 22 in the PSU 2. For example, the DC/DC conversion circuit 22 in the PSU 2-1 and the DC/DC conversion circuit 22 in the PSU 2-2 performs feedback control on the basis of the respective outputs (load balancing signals) of the respective DC/DC conversion circuits 22 so that the respective DC/DC conversion circuits 22 have substantially the same output current or substantially the same output voltage. That is, for example, the DC/DC conversion circuit 22 in the PSU 2-1 and the DC/DC conversion circuit 22 in the PSU 2-2 performs the feedback control on the basis of an output of an amplifier (not illustrated) that generates a signal corresponding to a difference between the respective outputs (load balancing signals) of the respective DC/DC conversion circuits 22.

The DC/DC conversion circuit 23 is a circuit that converts an output from the AC/DC conversion circuit 21 into a target voltage. In the example of the embodiment, a DC/DC conversion circuit 23 in a PSU 2 converts an output of the AC/DC conversion circuit 21 in the PSU 2 into a voltage of 12V, and outputs the converted signal to the BP 3. In addition, the DC/DC conversion circuit 23 in the PSU 2 outputs the converted signal to a DC/DC conversion circuit 23 in the other PSU 2 as a load balancing signal. In addition, a load balancing signal from the DC/DC conversion circuit 23 in the other PSU 2 is input to the DC/DC conversion circuit 23 in the PSU 2. For example, the DC/DC conversion circuit 23 in the PSU 2-1 and the DC/DC conversion circuit 23 in the PSU 2-2 performs feedback control on the basis of the respective outputs (load balancing signals) of the respective DC/DC conversion circuits 23 so that the respective DC/DC conversion circuits 23 have substantially the same output current or substantially the same output voltage. That is, for example, the DC/DC conversion circuit 23 in the PSU 2-1 and the DC/DC conversion circuit 23 in the PSU 2-2 performs the feedback control on the basis of an output of an amplifier (not illustrated) that generates a signal corresponding to a difference between the respective outputs (load balancing signals) of the respective DC/DC conversion circuits 23.

The control/monitoring circuit 24 monitors, for example, an output of each of the DC/DC conversion circuits 22 and 23. For example, the control/monitoring circuit 24 monitors output voltages and currents of the DC/DC conversion circuits 22 and 23, and stores values of the voltage and current in the register 25 included in the control/monitoring circuit 24. The control/monitoring circuit 24 detects various malfunctions of the DC/DC conversion circuits 22 and 23 by monitoring the voltage and current, etc. In addition, the control/monitoring circuit 24 performs on/off control of the DC/DC conversion circuits 22 and 23.

In addition, for example, when the control/monitoring circuit 24 detects an overvoltage malfunction in which an output of the DC/DC conversion circuit 22 or 23 is higher than a target voltage, the DC/DC conversion circuit having the overvoltage malfunction is turned off. In addition, when the control/monitoring circuit 24 detects a low voltage malfunction in which an output of the DC/DC conversion circuit 22 or 23 is lower than a target voltage, the DC/DC conversion circuit having the malfunction is turned off. In addition, when the control/monitoring circuit 24 detects an overcurrent in which an output current of the DC/DC conversion circuit 22 or 23 is greater than a target current or detects an abnormal temperature of the DC/DC conversion circuit 22 or 23, the DC/DC conversion circuit having the malfunction is turned off. Hereinafter, the turning-off of the DC/DC conversion circuit indicates the stop of an output of the DC/DC conversion circuit. In addition, the turning-on of the DC/DC conversion circuit indicates the start of an output of the DC/DC conversion circuit.

In addition, when a PSKILL signal is input from a programmable logic device (PLD) 46 described later of the CM 4, the control/monitoring circuit 24 stops an output of the PSU 2 by turning off the DC/DC conversion circuits 22 and 23. In addition, when the control/monitoring circuit 24 receives an instruction for outputting electric power of 12V (12V_on) from the outside of the PSU 2, the control/monitoring circuit 24 causes the DC/DC conversion circuit 23 to be turned on and causes the DC/DC conversion circuit 23 to output electric power of 12V.

Figure 3:
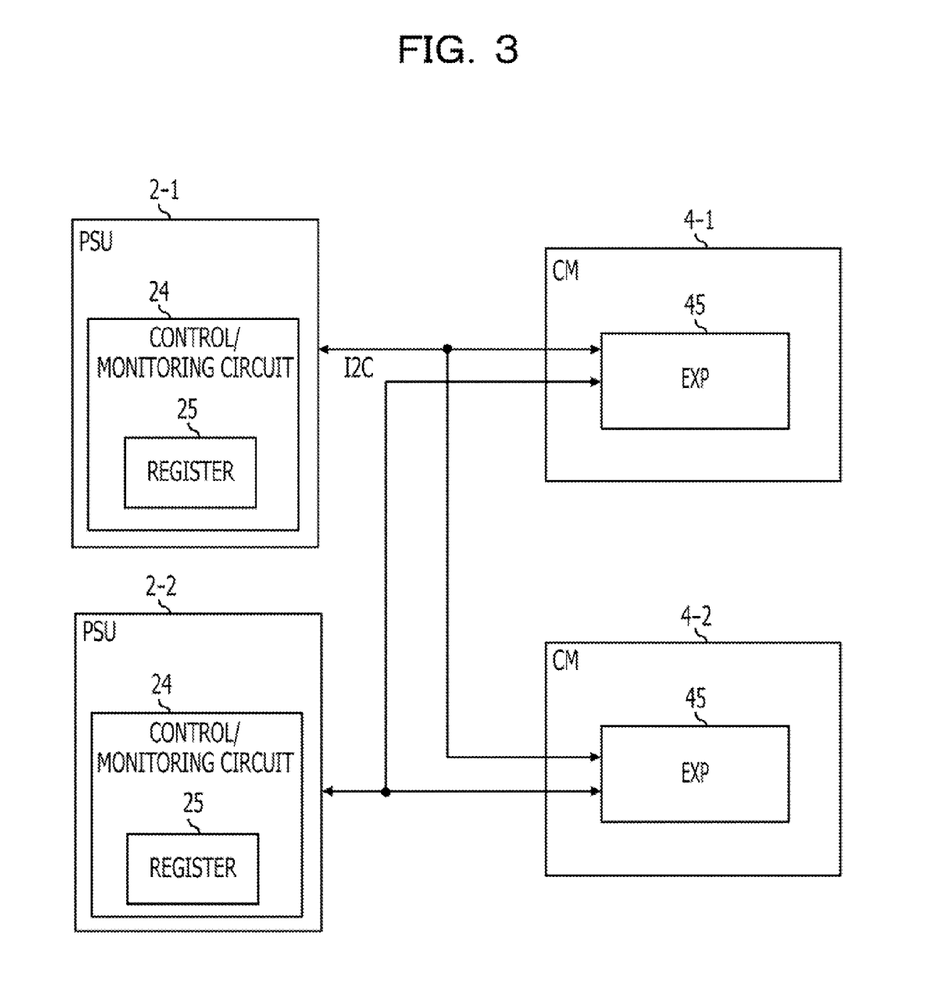
FIG. 3 illustrates a configuration between the PSU and a CM connected to the PSU through an I2C according to an example of the embodiment.

In addition, when a malfunction is detected, the control/monitoring circuit 24 outputs malfunction notification (DC_ALARM) to the CM 4. As illustrated in FIG. 3, the control/monitoring circuits 24 included in the PSUs 2-1 and 2-2 are communicatively coupled to each other through an expander (EXP) 45 and an inter integrated circuit (I2C) that are described later and included in each of the CMs 4-1 and 4-2. The EXP 45 obtains a value of the register 25 through the I2C.

The BP 3 merges two or more outputs from the PSUs 2-1 and 2-2 and supplies the merged output to each of the CMs 4-1 and 4-2. The BP 3 includes, for example, a power source line for 3.3V and a power source line for 12V, and a voltage of 3.3V output from the PSU 2 is input to the power source line for 3.3V, and a voltage of 12V output from the PSU 2 is input to the power source line for 12V. In addition, each of the power source lines merges two or more inputs from the PSUs 2-1 and 2-2 and supplies the merged input to each of the CMs 4-1 and 4-2.

Figure 4:
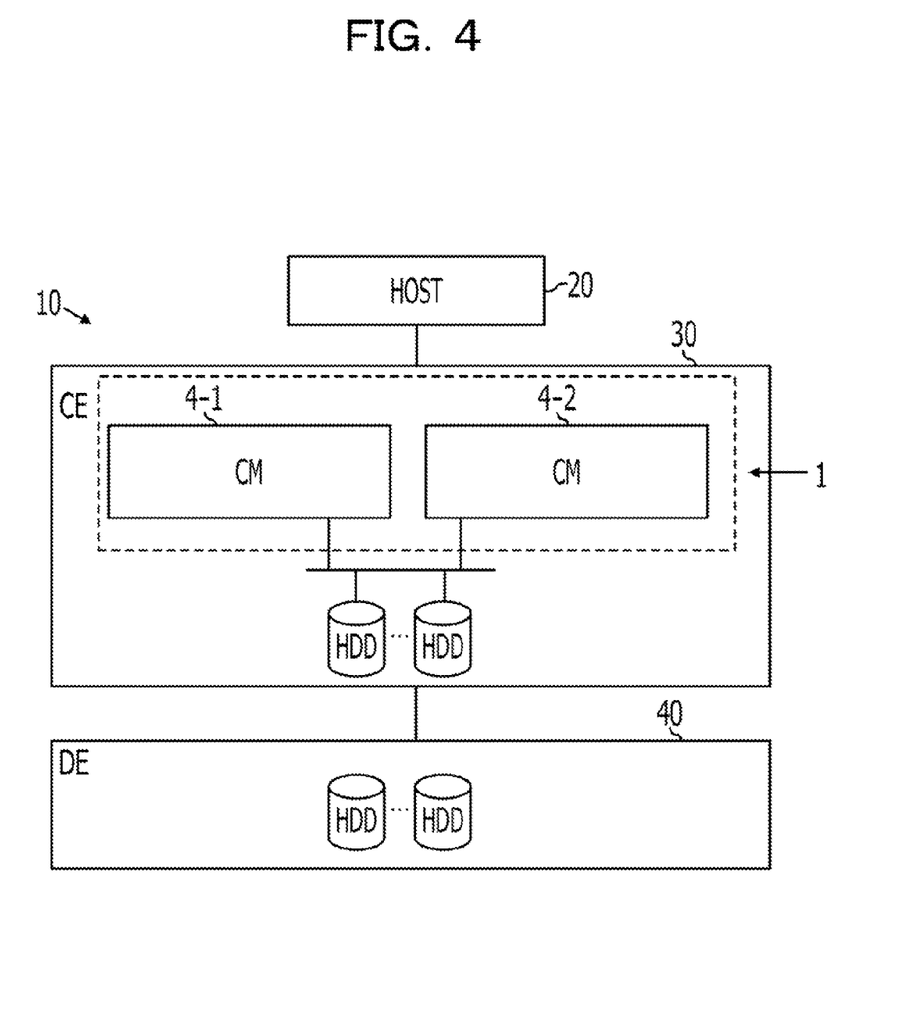
FIG. 4 illustrates a RAID apparatus according to an example of the embodiment.

The CM 4 is included, for example, in a controller enclosure (CE) 30 of a RAID apparatus 10 illustrated in FIG. 4 and controls read/write of a hard disk drive (HDD) included in the CE 30 or a drive enclosure (DE) 40 as requested from a host 20 that is a host apparatus. That is, the CM 4 functions as an example of a controller (control apparatus).

As illustrated in FIG. 1, the CM 4 includes, for example, a battery-backed hot swap circuit 41, a hot swap circuit 42, DC/DC conversion circuits 43 and 44, the EXP 45, the PLD 46, and diodes 47 and 48. Each of the electric power of 12V and electric power of 3.3V that are output from the BP 3 is input to each of the battery-backed hot swap circuit 41 and the hot swap circuit 42. In addition, the battery-backed hot swap circuit 41 is coupled to the DC/DC conversion circuits 43 and 44, and the DC/DC conversion circuit 43 is coupled to the EXP 45. In addition, the DC/DC conversion circuit 44 is coupled to the PLD 46 through the diode 47 for blocking reverse flow. In addition, the hot swap circuit 42 is coupled to the PLD 46 through the diode 48 for blocking reverse flow.

The battery-backed hot swap circuit 41 controls electric power supply from the BP 3 to each of the units in the CM 4 under the control of the PLD 46. For example, the battery-backed hot swap circuit 41 stops the electric power supply from the BP 3 to each of the units in the CM 4 and supplies power from a battery to each of the units in the CM 4 on the basis of the control of the PLD 46 when a voltage supplied from the PSU 2 through the BP 3 is an overvoltage.

Figure 5:
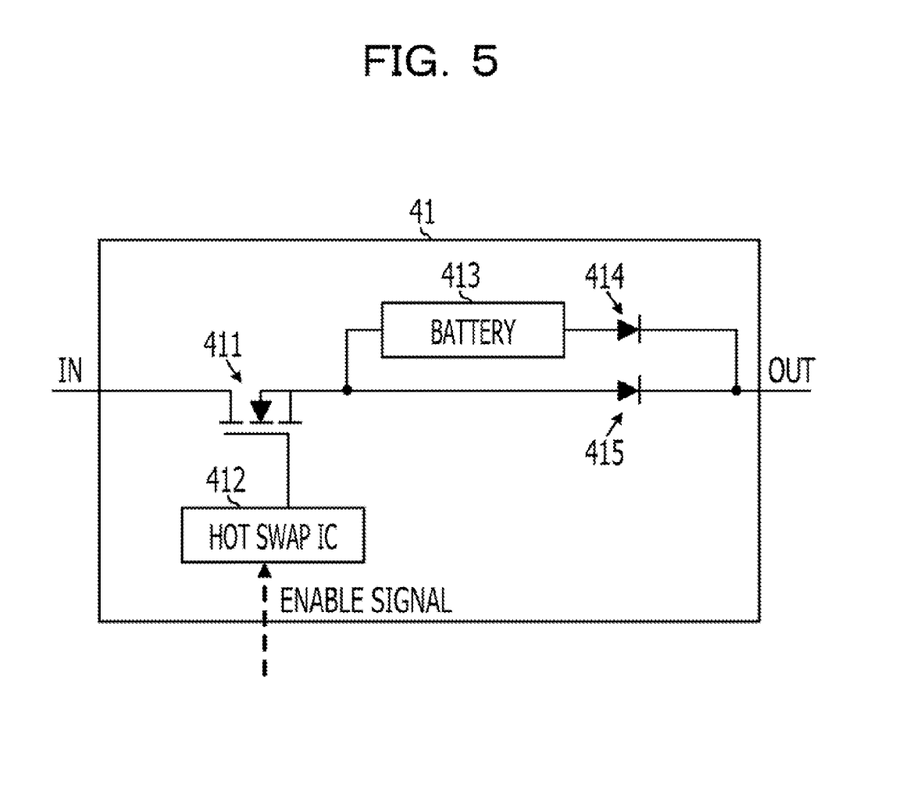
FIG. 5 illustrates a configuration of a battery-backed hot swap circuit as an example of the embodiment.

FIG. 5 illustrates a configuration of the battery-backed hot swap circuit 41. The battery-backed hot swap circuit 41 includes a switch 411, a hot swap integrated circuit (IC) 412, a battery 413, and diodes 414 and 415. For example, a gate of the switch 411 that is a metal oxide semiconductor (MOS) is coupled to the hot swap IC 412, and a drain of the switch 411 is coupled to the BP 3. In addition, a source of the switch 411 is coupled to the battery 413 and the anode-side of the diode 414 for blocking reverse flow. In addition, the battery 413 is coupled to the anode-side of the diode 415 for blocking reverse flow. In addition, the cathode-sides of the diodes 414 and 415 are coupled to each other, and each of the cathode-sides of the diodes 414 and 415 is coupled to the PLD 46.

The switch 411 is, for example, a MOS switch, and controls power distribution between an input and an output of the battery-backed hot swap circuit 41. For example, when the switch 411 is turned on, power is applied between the input and the output of the battery-backed hot swap circuit 41, and electric power from the BP 3 is supplied to each of the units in the CM 4. In addition, when the switch 411 is turned off, power is not applied between the input and the output of the battery-backed hot swap circuit 41. After that, electric power from the BP 3 is not supplied to each of the units in the CM 4, and electric power from the battery 413 is supplied to each of the units in the CM 4. Hereinafter, the turning-on of the switch 411 indicates the turning-on of the battery-backed hot swap circuit 41, and the turning-off of the switch 411 indicates the turning-off of the battery-backed hot swap circuit 41.

The hot swap IC 412 is a circuit that controls the on/off of the switch 411 on the basis of a control signal (enable signal) from the PLD 46. For example, the hot swap IC 412 causes the switch 411 to be turned on when the control signal is high, and the hot swap IC 412 causes the switch 411 to be turned off when the control signal is low. The battery 413 is, for example, an electric double layer capacitor, and supplies electric power to each of the units in the CM 4 when the switch 411 is turned off. That is, the battery 413 functions as an example of a backup electric power supply unit that supplies electric power to the controller. In addition, for example, a voltage of the battery 413 is lower than a voltage applied to the battery-backed hot swap circuit 41 when the PSU 2 functions normally, and, for example, a voltage of 11V is applied to each of the units in the CM 4.

The battery 413 included in the battery-backed hot swap circuit 41 is charged by electric power supplied from the PSU 2 through the BP 3, for example, when a malfunction such as an overvoltage malfunction does not occur. In addition, the charged electric power is supplied to each of the units in the CM 4 when a malfunction such as an overvoltage malfunction occurs. The hot swap circuit 42 controls electric power supply from the BP 3 to each of the units in the CM 4 under the control of the PLD 46. The hot swap circuit 42 has a similar configuration to the battery-backed hot swap circuit 41 except for the battery 413 and the diode 414 for blocking reverse flow. That is, when the switch 411 included in the hot swap circuit 42 is turned on, power is applied between an input and an output of the hot swap circuit 42 and electric power from the BP 3 is supplied to each of the units in the CM 4. In addition, when the switch 411 included in the hot swap circuit 42 is turned off, power is not applied between the input and the output of the hot swap circuit 42 and electric power from the BP 3 is not supplied to each of the units in the CM 4. Thus, hereinafter, the turning-on of the switch 411 included in the hot swap circuit 42 indicates the turning-on of the hot swap circuit 42, and the turning-off of the switch 411 included in the hot swap circuit 42 indicates the turning-off of the hot swap circuit 42.

The DC/DC conversion circuit 43 is a circuit that converts an output from the battery-backed hot swap circuit 41 into a target voltage, and supplies the converted voltage to the EXP 45. The DC/DC conversion circuit 44 is a circuit that converts an output from the battery-backed hot swap circuit 41 into a target voltage, and supplies the converted voltage to the PLD 46. The EXP 45 includes, for example, a central processing unit (CPU), and controls an interface between the EXP 45 and an HDD of the CE 30 in the RAID apparatus 10. In addition, the EXP 45 is a processing apparatus that performs various functions by executing a program stored in a storage unit (not illustrated).

Figure 6:
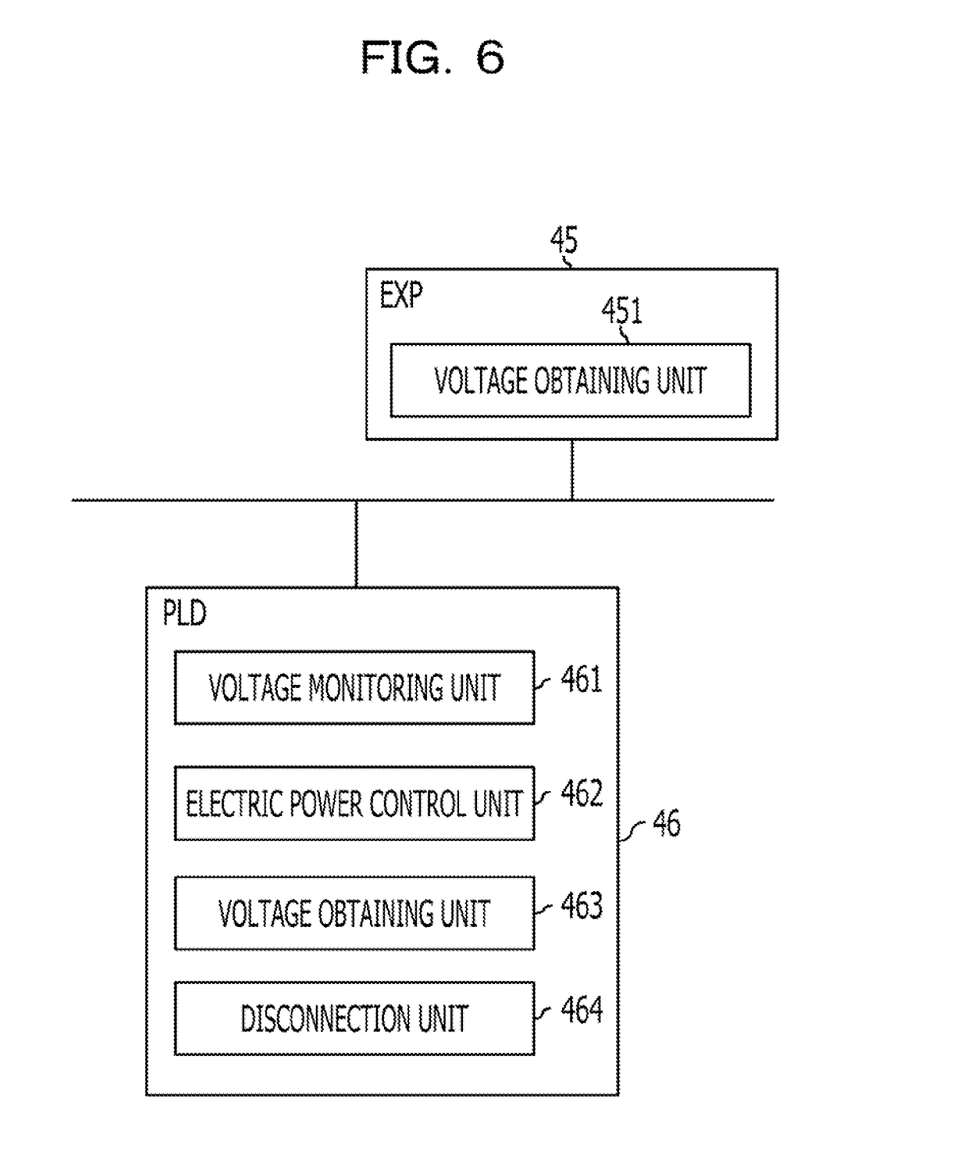
FIG. 6 illustrates a function configuration between an EXP and a PLD as an example of the embodiment.

The PLD 46 is also a processing apparatus that performs various functions in accordance with a program. FIG. 6 illustrates a function configuration of the EXP 45 and the PLD 46. Here, the EXP 45 and the PLD 46 may be coupled to each other, for example, through a bus. For example, the EXP 45 functions as a voltage obtaining unit 451 by executing the program stored in the storage unit (not illustrated).

The voltage obtaining unit 451 obtains output voltage (internal voltage) values of the DC/DC conversion circuits 22 and 23 included in the PSU 2 from the register 25 in the PSU 2 through the I2C. In addition, the voltage obtaining unit 451 detects an overvoltage malfunction and a low voltage malfunction on the basis of the obtained voltage values, and identifies the PSU 2 having the malfunction. For example, the voltage obtaining unit 451 detects an overvoltage malfunction or a low voltage malfunction by comparing an output voltage obtained when the PSU 2 functions normally, with the obtained output voltage of the DC/DC conversion circuits 22 and 23. In addition, the voltage obtaining unit 451 may detect an overvoltage malfunction and a low voltage malfunction, for example, by comparing a threshold value for determining that an overvoltage malfunction or a low voltage malfunction occurs, with the obtained output voltage of the DC/DC conversion circuits 22 and 23. That is, the voltage obtaining unit 451 functions as an example of a voltage obtaining unit that obtains an output voltage of each electric power supply unit and as an example of a malfunction location identification unit that identifies an electric power supply unit having the malfunction among from the two or more electric power supply units.

In addition, the PLD 46 functions as a voltage monitoring unit 461, an electric power control unit 462, a voltage obtaining unit 463 and a disconnection unit 464 depending on a program. The voltage monitoring unit 461 monitors, for example, voltages (voltages at "A" point and "B" point illustrated in FIG. 1) input to the battery-backed hot swap circuit 41 and the hot swap circuit 42, and detects a malfunction occurring in the PSU 2. The "A" point is located at an "input"

of the battery-backed hot swap circuit 41, and the "B" point is located at an "input" of the hot swap circuit 42. That is, the voltage monitoring unit 461 functions as an example of a malfunction detector unit that detects a malfunction occurring in the electric power supply unit. For example, the voltage monitoring unit 461 performs A/D conversion for a voltage input to the battery-backed hot swap circuit 41 and the hot swap circuit 42, and monitors the converted voltage in the CM 4. As a result, an overvoltage malfunction in the PSU 2 is detected. An A/D conversion circuit (not illustrated) that performs A/D conversion for a voltage input to the battery-backed hot swap circuit 41 and the hot swap circuit 42 is included, for example, in the PLD 46. In addition, the A/D conversion circuit may not be included in the PLD 46, and may be included in the CM 4 or other locations.

In addition, the voltage monitoring unit 461 monitors a voltage input to each of the battery-backed hot swap circuit 41 and the hot swap circuit 42, that is, a voltage that is output from the PSU 2 and input to the CM 4 through the BP 3 without monitoring an output of the PSU 2. Thus, the voltage monitoring unit 461 detects an overvoltage malfunction caused by the PSU 2 and an overvoltage malfunction caused by the BP 3 such as an element between the CM 4 and the PSU 2.

The electric power control unit 462 performs the control of the battery-backed hot swap circuit 41 and the hot swap circuit 42, on the basis of the monitoring result of the voltage monitoring unit 461. For example, the electric power control unit 462 causes the battery-backed hot swap circuit 41 and the hot swap circuit 42 to be turned off when the voltage monitoring unit 461 detects an overvoltage malfunction. As a result, the electric power control unit 462 switches the supplier of electric power to the element in the CM 4, from the PSU 2 to the battery 413. In addition, when the voltage monitoring unit 461 determines that the overvoltage returns to the normal voltage, the electric power control unit 462 causes the battery-backed hot swap circuit 41 and the hot swap circuit 42 to be turned on. As a result, the electric power control unit 462 switches the supplier of electric power to the element in the CM 4, from the battery 413 to the PSU 2. That is, when the voltage monitoring unit 461 detects an overvoltage malfunction, the electric power control unit 462 stops the electric power supply from the PSU 2 and starts electric power supply from the battery 413. In addition, when the disconnection unit 464 described later disconnects the PSU 2 having an overvoltage malfunction, the electric power control unit 462 resumes electric power supply form the PSU 2 that is determined to function normally, and stops the electric power supply from the battery 413. That is, the electric power control unit 462 functions as an example of an electric power control unit that controls electric power supply from two or more electric power supply units and a backup electric power supply unit.

The voltage obtaining unit 463 performs A/D conversion for a load balancing signal between the PSU 2-1 and the PSU 2-2, and obtains an output voltage (internal voltage) of the DC/DC conversion circuits 22 and 23 included in the PSU 2. The voltage obtaining unit 463 detects an overvoltage malfunction or a low voltage malfunction on the basis of the obtained voltage, and identifies the PSU 2 having the malfunction. For example, the voltage obtaining unit 463 detects an overvoltage malfunction or a low voltage malfunction by comparing an output voltage obtained when the PSU 2 functions normally, with an obtained output voltage of the DC/DC conversion circuits 22 and 23. In addition, the voltage obtaining unit 463 may detect an overvoltage malfunction or a low voltage malfunction, for example, by comparing a threshold value for determining that an overvoltage malfunction or a low voltage malfunction occurs, with an obtained output voltage of the DC/DC conversion circuits 22 and 23. That is, the voltage obtaining unit 463 functions as an example of the voltage obtaining unit that obtains an output voltage of each electric power supply unit and an example of the malfunction location identification unit that identifies an electric power supply unit having the malfunction among from the two or more electric power supply units. An A/D (analog/digital) conversion circuit (not illustrated) that performs A/D conversion for a load balancing signal is included, for example, in the PLD 46. In addition, the A/D conversion circuit may not be included in the PLD 46, and may be included in the CM 4 or other locations.

The disconnection unit 464 disconnects the PSU 2 having a malfunction identified by the voltage obtaining unit 463 or the voltage obtaining unit 451, from the CM 4. For example, the disconnection unit 464 transmits a PSKILL signal to the control/monitoring circuit 24 of the identified PSU 2 having a malfunction, and stops the output of the identified PSU 2 having a malfunction, thereby disconnecting the CM 4. That is, the disconnection unit 464 functions as an example of a malfunction location disconnection unit that disconnects the electric power supply unit having a malfunction identified by the malfunction location identification unit.

Figure 7:
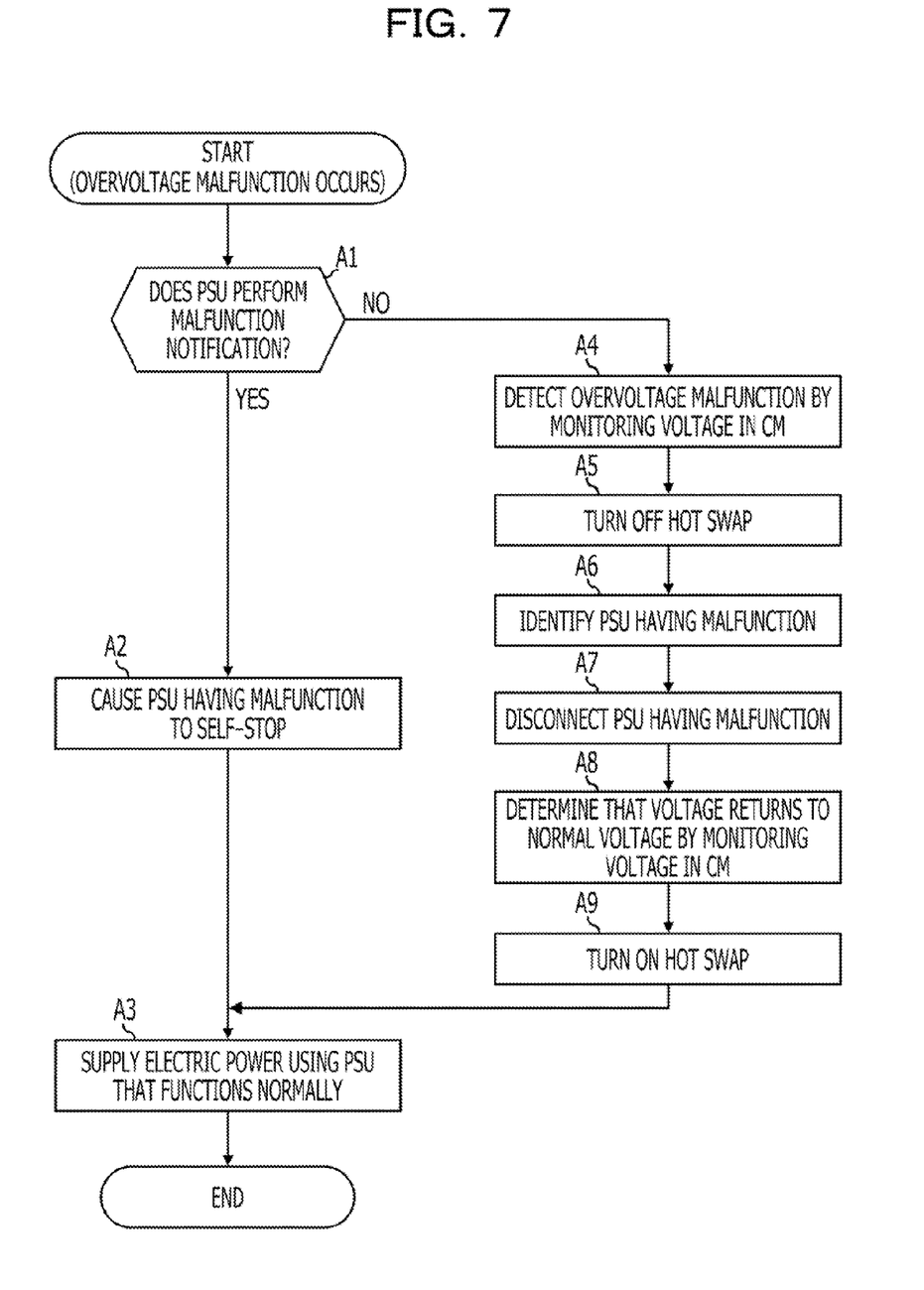
FIG. 7 illustrates a flowchart of operations of a system as an example of the embodiment.

Description is made for an operation in a case where an overvoltage malfunction occurs in the system 1 that is the example of the embodiment and that is configured as described above, with reference to a flowchart illustrated in FIG. 7 (A1 to A9). As an example, description is made for a case where an overvoltage malfunction occurs in the PSU 2-1. When the PSU 2-1 performs malfunction notification (YES, in A1), that is, when the PSU 2-1 functions normally, the PSU 2-1 having an overvoltage malfunction self-stops (A2). For example, the control/monitoring circuit 24 of the PSU 2-1 having the overvoltage malfunction causes the output of the DC/DC conversion circuit 22 or 23 having the overvoltage to stop. In addition, electric power is supplied to the CM 4 merely using the PSU 2-2 that functions normally (A3).

When the PSU 2 does not perform malfunction notification (No, in A1), that is when the PSU 2-1 may not self-stop due to a malfunction such as an internal voltage malfunction, the voltage monitoring unit 461 detects an overvoltage malfunction by monitoring a voltage input into the each of battery-backed hot swap circuit 41 and the hot swap circuit 42 (A4). After that, the electric power control unit 462 turns off the battery-backed hot swap circuit 41 and the hot swap circuit 42 (A5). As a result, the overvoltage is not input to the CM 4, and each of the units in the CM 4 may be substantially prevented from suffering damage from the overvoltage. In addition, when the battery-backed hot swap circuit 41 and the hot swap circuit 42 are turned off, the CM 4 operates by a power supply from the battery 413. After that, the voltage obtaining unit 463 performs A/D conversion for load balancing signals of the PSUs 2-1 and 2-2, obtains an output voltage of the PSUs 2-1 and 2-2, and identifies the PSU 2-1 having an overvoltage malfunction on the basis of the obtained voltage (A6). The voltage obtaining unit 451 may obtain each output voltage of the PSUs 2-1 and 2-2 from the registers 25 of the PSUs 2-1 and 2-2 through the I2C, and identify the PSU 2-1 having an overvoltage malfunction. When the PSU 2-1 having an overvoltage malfunction is identified, the disconnection unit 464 transmits a PSKILL signal, for example, to the control/monitoring circuit 24 of the identified PSU 2-1 having a malfunction, and disconnects the identified PSU 2-1 having a malfunction (A7). In addition, the voltage monitoring unit 461 monitors a voltage input to each of the battery-backed hot swap circuit 41 and the hot swap circuit 42, and determines that the voltage returns to the normal voltage (A8). After that, the electric power control unit 462 turns on the battery-backed hot swap circuit 41 and the hot swap circuit 42 (A9). As a result, electric power is supplied to the CM 4 merely using the PSU 2-2 that functions normally (A3).

Figure 8:
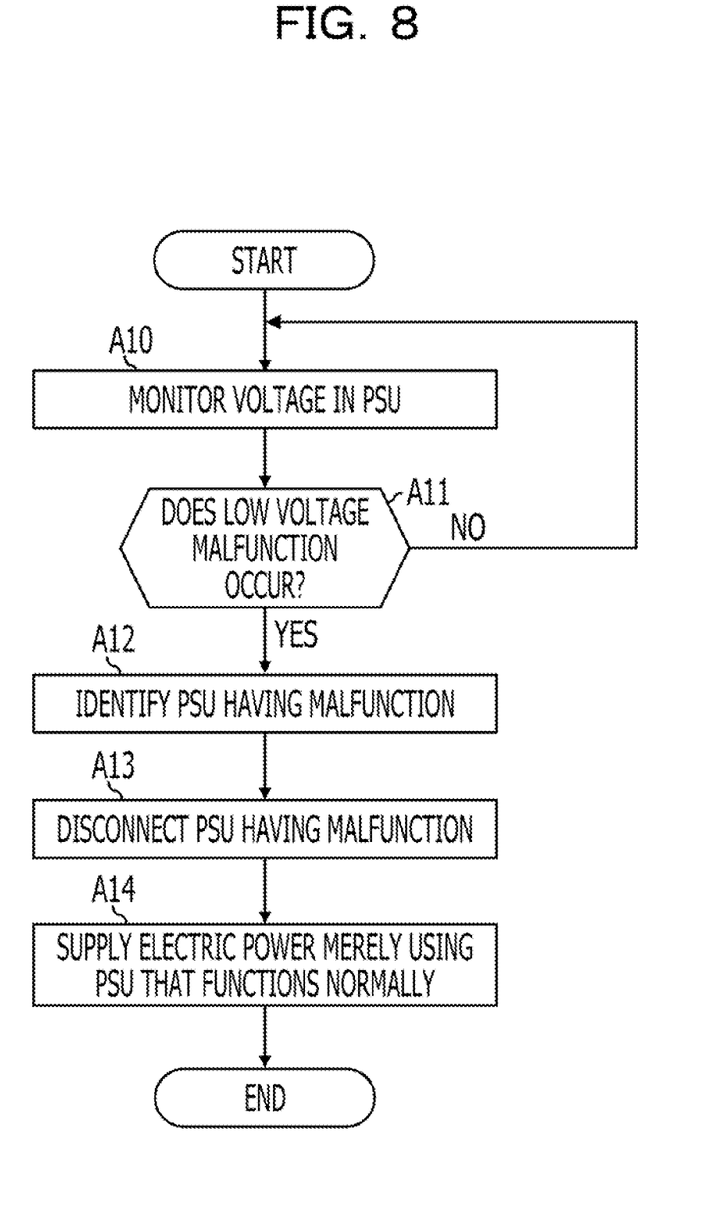
FIG. 8 illustrates a flowchart of operations of a system as an example of the embodiment.

Description is made for an operation when a low voltage malfunction occurs in a case where the PSU 2-1 of the system 1 that is the example of the embodiment and that is configured as described above may not self-stop due to a malfunction such as an internal voltage malfunction, with reference to a flowchart (A10 to A14) illustrated in FIG. 8. First, the voltage obtaining unit 451 or the voltage obtaining unit 463 obtains (monitors) a voltage in the PSU 2 (A10), and determines whether a low voltage malfunction occurs (A11). When a low voltage malfunction does not occur (No, in A11), the flow returns to A10. When a low voltage malfunction occurs (YES, in A11), the voltage obtaining unit 451 or the voltage obtaining unit 463 identifies the PSU 2 having the low voltage malfunction, on the basis of the obtained voltage (A12). After that, the disconnection unit 464 transmits a PSKILL signal to the identified PSU 2 having the low voltage malfunction, and disconnects the PSU 2 having the low voltage malfunction (A13). As a result, electric power is supplied to the CM 4 merely using the other PSU 2 that functions normally (A14).

As described above, according to the example of the embodiment, even when the PSU 2 may not self-detect a malfunction, the PSU 2 having the malfunction may be identified without the stop of a system including the CM and the PSU. In addition, in the example of the embodiment, when an overvoltage malfunction is detected, the battery-backed hot swap circuit 41 and the hot swap circuit 42 are turned off, and the battery 413 supplies electric power to each of the units in the CM 4 such as the PLD 46. In addition, the PLD 46 to which the electric power is supplied from the battery 413 identifies the PSU 2 having a malfunction and disconnects the PSU 2. Thus, the CM 4 may be protected from the overvoltage and disconnect the PSU 2 having the malfunction. That is, in the example of the embodiment, without the stop of the system 1, the PSU 2 having a malfunction may be identified and disconnected.

In addition, in the example of the embodiment, when an overvoltage malfunction is detected, the battery-backed hot swap circuit 41 and the hot swap circuit 42 are turned off, and the element in the CM 4 is protected from the overvoltage. Thus, in the example of the embodiment, the CM 4 may be prevented from the stop of the operation caused by a memory access malfunction, etc. stemmed from the overvoltage in the CM 4, and it may be prevented that the EXP 45 included in the CM 4 does not obtain an output voltage of the PSU 2 using the I2C.

In addition, in the example of the embodiment, the voltage obtaining unit 451 or the voltage obtaining unit 463 continuously monitors a voltage in the PSU 2. Thus, in the example of the embodiment, the PSU 2 having the malfunction may be detected swiftly in comparison with a conventional method in which a voltage in the PSU 2 is obtained when a malfunction notification signal is transmitted from the PSU 2. In addition, in the example of the embodiment, the voltage obtaining unit 463 performs A/D conversion for a load balancing sign output from the anode-side of the diodes 26 and 27, and obtains an output voltage of the PSU 2. Thus, in the example of the embodiment, an output voltage of the PSU 2 may be obtained independently of the other PSU 2 operating in parallel.

In addition, in the example of the embodiment, the voltage monitoring unit 461 detects an overvoltage malfunction. Alternatively, for example, the voltage obtaining unit 451 or the voltage obtaining unit 463 may detects an overvoltage malfunction from outputs of the PSU 2. In addition, in the example of the embodiment, the disconnection unit 464 stops an output of the PSU 2 using a PSKILL signal. Thus, in the example of the embodiment, the PSU 2 may be disconnected easily using a PSKILL signal.

Other Embodiments

The disclosed technology is not limited to the above-described embodiments, and various modifications and changes may be made without departing from the spirit and the scope of the embodiment. In the example of the embodiment, the PLD 46 transmits a PSKILL signal to the control/monitoring circuit 24. Alternatively, for example, the PLD 46 may transmit a PSKILL signal to the DC/DC conversion circuits 22 and 23, and the DC/DC conversion circuits 22 and 23 that receive the PSKILL signal self-stop. As a result, the PSU 2 having a malfunction may be disconnected even when the malfunction occurs in the control/monitoring circuit 24 and the DC/DC conversion circuits 22 and 23 are not allowed to be turned off.

In addition, in the example of the embodiment, the battery 413 is provided in the battery-backed hot swap circuit 41. Alternatively, for example, the battery 413 may be independently provided in the CM 4. In addition, in the example of the embodiment, the voltage monitoring unit 461 monitors the voltages at the A point and the B point in FIG. 1. Alternatively, a monitoring point may be a point at which it may be determined that an overvoltage malfunction or a voltage from the BP 3 returns to the normal voltage.

In addition, in the example of the embodiment, the description is made using two of the PSUs 2. Alternatively, description may be made using more than three of the PSUs 2. In addition, in the example of the embodiment, the description is made using two of the CMs 4. Alternatively, description may be made using a single CM 4 or more than three of the CMs 4. In addition, in the example of the embodiment, description is made for the case in which one of the PSUs 2-1s and 2-2 has a malfunction. Alternatively, when all PSUs 2 have a malfunction, all of the PSUs 2 may be disconnected and a processing apparatus (not illustrated) such as a CPU in the CM 4 may perform, for example, cache backup using a power supplied from the battery 413.

In addition, in the example of the embodiment, description is made for the case in which the system 1 that is an example of an information processing apparatus is applied to the RAID apparatus 10. Alternatively, for example, the information processing apparatus may be applied to another apparatus such as a server.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing apparatus comprising:
   a controller;
      a plurality of electric power supply units;

a back plane to merge output voltages of the plurality of electric power supply units and to supply the merged output voltage to the controller; and a backup electric power supply unit, the controller being configured to, detect a malfunction occurring in the plurality of electric power supply units, stop supplying the merged output voltage to the controller through the back plane from the plurality of electric power supply units when the malfunction is detected, start supplying a voltage to the controller from the backup electric power supply unit when the malfunction is detected, identify an electric power supply unit having the malfunction from the plurality of electric power supply units, disconnect the identified electric power supply unit, determine whether the merged output voltage is normal when disconnecting the identified electric power supply unit, resume supplying the merged output voltage to the controller through the back plane from an electric power supply unit when determining that the merged output voltage is normal, and stop the supplying the voltage from the backup electric power supply unit to the controller when the electric power supply unit having the malfunction is disconnected.

2. The information processing apparatus according to claim 1, wherein
the controller obtains an output voltage of each of the plurality of electric power supply units, and identifies the electric power supply unit having the malfunction, on the basis of the obtained output voltage.

3. The information processing apparatus according to claim 1, wherein the controller monitors the merged output voltage so as to detect a malfunction.

4. The information processing apparatus according to claim 2, wherein
the controller identifies an electric power supply unit having a low voltage malfunction from the plurality of electric power supply units, on the basis of the obtained output voltage, and disconnects the electric power supply unit having the low voltage malfunction.

5. A control method for supplying a merged voltage that output voltages of a plurality of electric power supply units in an information processing apparatus are merged to a controller in an information processing apparatus, the control method comprising:

detecting a malfunction occurring in a plurality of electric power supply units that supplies the merged voltage to the controller;

stopping supply of the merged voltage to the controller through the back plane from the plurality of electric power supply units and starting supply of the voltage to the controller from a backup electric power supply unit when the malfunction is detected;

identifying an electric power supply unit having the malfunction from the plurality of electric power supply units;

disconnecting the identified electric power supply unit;

determining whether the merged output voltage is normal based on the obtained merged output voltage; and resuming supply of the merged output voltage to the controller from an electric power supply unit when determining that the merged output voltage is normal, and stopping the supply of the voltage from the backup electric power supply unit to the controller when the electric power supply unit having the malfunction is disconnected.

6. The control method according to claim 5, further comprising:
  obtaining an output voltage of each of the plurality of electric power supply units,
  wherein the identifying includes identifying the electric power supply unit having the malfunction, on the basis of the obtained output voltage.

7. The control method according to claim 5, further comprising:
  monitoring the merged voltage so as to detect a malfunction.

8. The control method according to claim 6, wherein
  the identifying includes identifying an electric power supply unit having a low voltage malfunction from the plurality of electric power supply units, on the basis of the output voltage obtained by the obtaining, and
  the disconnecting includes disconnecting the electric power supply unit having the low voltage malfunction.

9. A control apparatus that receives supply of a merged output voltage through a back plane from a plurality of electric power supply units, the back plane merging output voltages of the plurality of electric power supply units, the control apparatus comprising:

a backup electric power supply unit that supplies a voltage to the control apparatus;

a malfunction detector that detects a malfunction occurring in the plurality of electric power supply units;

a malfunction location identification unit that identifies an electric power supply unit having the malfunction from the plurality of electric power supply units when the malfunction is detected by the malfunction detector;

a malfunction location disconnection unit that disconnects the electric power supply unit identified by the malfunction location identification unit; and an electric power controller that stops supply of the merged output voltage through the backplane from the plurality of electric power supply units and starts supply of the voltage from the backup electric power supply unit when a malfunction is detected by the malfunction detector, the electric power controller determining whether the merged output voltage is normal when disconnecting the identified electric power supply unit, the electric power controller resuming supply of the merged output voltage through the backplane from an electric power supply unit when determining that the merged output voltage is normal and stopping the supply of the voltage from the backup electric power supply unit when the electric power supply unit having the malfunction is disconnected by the malfunction location disconnection unit.

10. The control apparatus according to claim 9, further comprising:
  a voltage obtaining unit that obtains an output voltage of each of the plurality of electric power supply units,
  wherein the malfunction location identification unit identifies the electric power supply unit having the malfunction, on the basis of the output voltage obtained by the voltage obtaining unit.

11. The control apparatus according to claim 9, wherein the malfunction detector monitors the merged output voltage so as to detect the malfunction.

12. The control apparatus according to claim 10, wherein the malfunction location identification unit identifies an electric power supply unit having a low voltage malfunction from the plurality of electric power supply units, on the basis of the output voltage obtained by the voltage obtaining unit, and the malfunction location disconnection unit disconnects the electric power supply unit having the low voltage malfunction.

* * * * *